United States Patent [19]

Quedens

[11] Patent Number: 4,748,457
[45] Date of Patent: May 31, 1988

[54] RECORDING DEVICE FOR RECORDING INFORMATION ON A PAPER MEDIUM

[75] Inventor: Phillipp J. Quedens, Hartford, Conn.

[73] Assignee: American Home Products Corporation (Del.), New York, N.Y.

[21] Appl. No.: 488

[22] Filed: Jan. 5, 1987

[51] Int. Cl.$^4$ ............................................. G01D 15/24
[52] U.S. Cl. .................................. 346/136; 400/613.2
[58] Field of Search ............... 346/136; 400/612, 613, 400/613.2, 613.4

[56] References Cited

U.S. PATENT DOCUMENTS 3,389,401  6/1968  Neff ........................................ 346/136
4,218,031  8/1980  Camier ................................... 346/136
4,396,926  8/1983  Manning ................................ 346/136
4,668,960  5/1987  Okamura ............................... 346/136

Primary Examiner—E. A. Goldberg
Assistant Examiner—Mark Reinhart

[57] ABSTRACT

In a device for recording information on strip chart paper, a paper tray, paper guide and door having a trench area are positioned relative to one another to inhibit lateral movement of the paper during recordal of the information. The trench area which is located between the paper storage tray and paper guide receives and traps the paper between its walls to ensure that the paper travels along a predetermined path. The paper storage tray is slightly tilted to further ensure that the paper follows the desired path of travel.

15 Claims, 5 Drawing Sheets

RECORDING DEVICE FOR RECORDING INFORMATION ON A PAPER MEDIUM

FIELD OF INVENTION

The present invention relates to the recording of information on a paper medium and, more particularly, is directed toward an apparatus for controlling the path along which the paper medium advances as information is being recorded thereon.

BACKGROUND OF THE INVENTION

Medical monitors often include recording devices for memorializing on a paper medium information detected by the monitor. Typically, the paper medium is a chart or graph with the information plotted on the paper medium by a printer of the recording device in the form of a curve. It is therefore critical in accurately plotting the curve that the paper medium be properly positioned relative to the printer.

For example, in recording fetal heart rates, guard rails which are located on either side of a paper roller serve as stops to prevent the lateral (i.e. side to side) movememt of the strip chart paper as the printer plots the fetal heart rate on the paper. These guard rails are distanced from each other by a length sufficient to allow for a maximum variation in the width of the paper due to manufacturing tolerances. Consequently, strip chart paper having a width which is less than the fixed distance between the guard rails is able to travel therebetween. This can be expecially troublesome since the fetal heart rate scale extends in the same diretion as the width of the strip chart paper. In particular, since the distance between incremental fetal heart rates (referred to as beats) is only approximately 2/1000 of an inch, even slight deviations from the desired path of the paper due to the paper drifting between the guard rails will result in heart rates incorrectly recorded.

Furthermore, quite often when the printer stops plotting, whether for a moment or longer, the path of the strip chart paper changes direction within the boundaries set by the guard rails. Therefore, in order to reduce the tendency of the paper to deviate from its desired path the paper needs to be repositioned relative to the printer and advanced a number of pages beyond the printer prior to turning the printer on again.

OBJECTS AND SUMMARY OF THE INVENTION

Accordingly, it is an object of the present invention to provide a device which overcomes the above prior art drawbacks.

More specifically, is an object of the present invention to provide a new and improved recording device which urges the paper to travel along a predetermined path as the paper is advanced past the printer.

It is another object of the invention to reduce the tendency of the paper to become misaligned whenever the printer is stopped.

It is yet another object of the invention to reduce the amount of paper which needs to be advanced past the printer prior to turning the printer on each time.

In accordance with one aspect of the invention, a recording device for recording information on a paper medium comprises storage means for holding and dispensing said paper medium and includes storage guide means which extend in a first plane and which inhibit lateral movement of said paper medium as the latter is dispensed from said storage means; door means for access to said storage means and including a trench having first and second walls; plate means for trapping said paper medium between said walls of said trench; and paper guide means for inhibiting lateral movement of said paper medium as said information is being recorded thereon wherein said first wall of said trench and said paper guide means extend in a second plane different from said first plane for urging said paper medium against said first wall and said paper guide means such that said paper medium follows a predetermined path defined by said first wall and paper guide means. Normally, the recording device rests on a horizontal surface such that the storage means is tilted relative to the horizontal surface.

The above, and other objects, features and advantages of the present invention will become from the following detailed description which is to be read in conjunction with the accompanying drawings wherein like reference numerals appearing in the various drawings refer to the same elements.

DETAILED DESCRIPTION OF A PREFERRED EMBODIMENT

Figure 1:
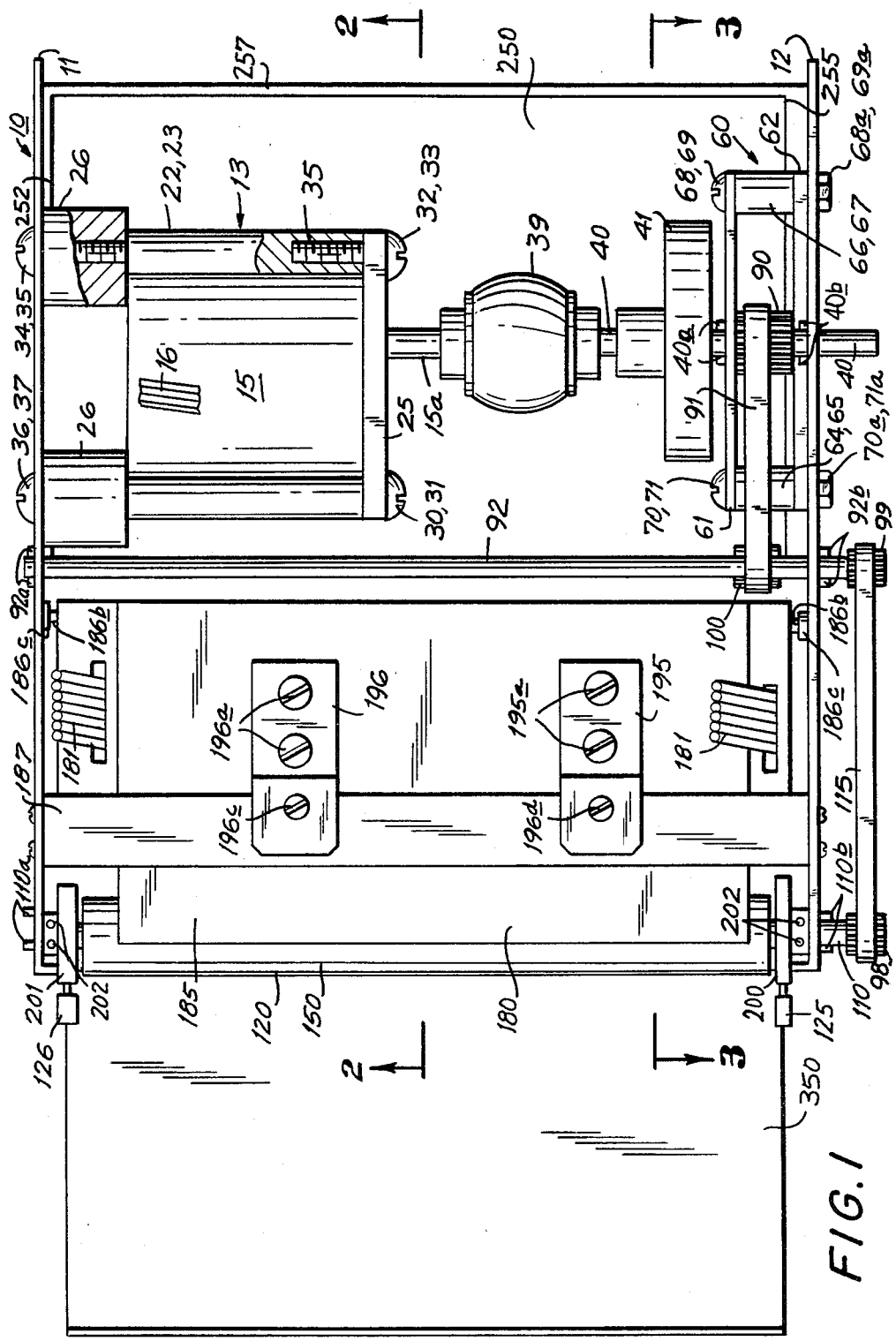
FIG. 1 is a top plan view of a recording device.
Figure 2:
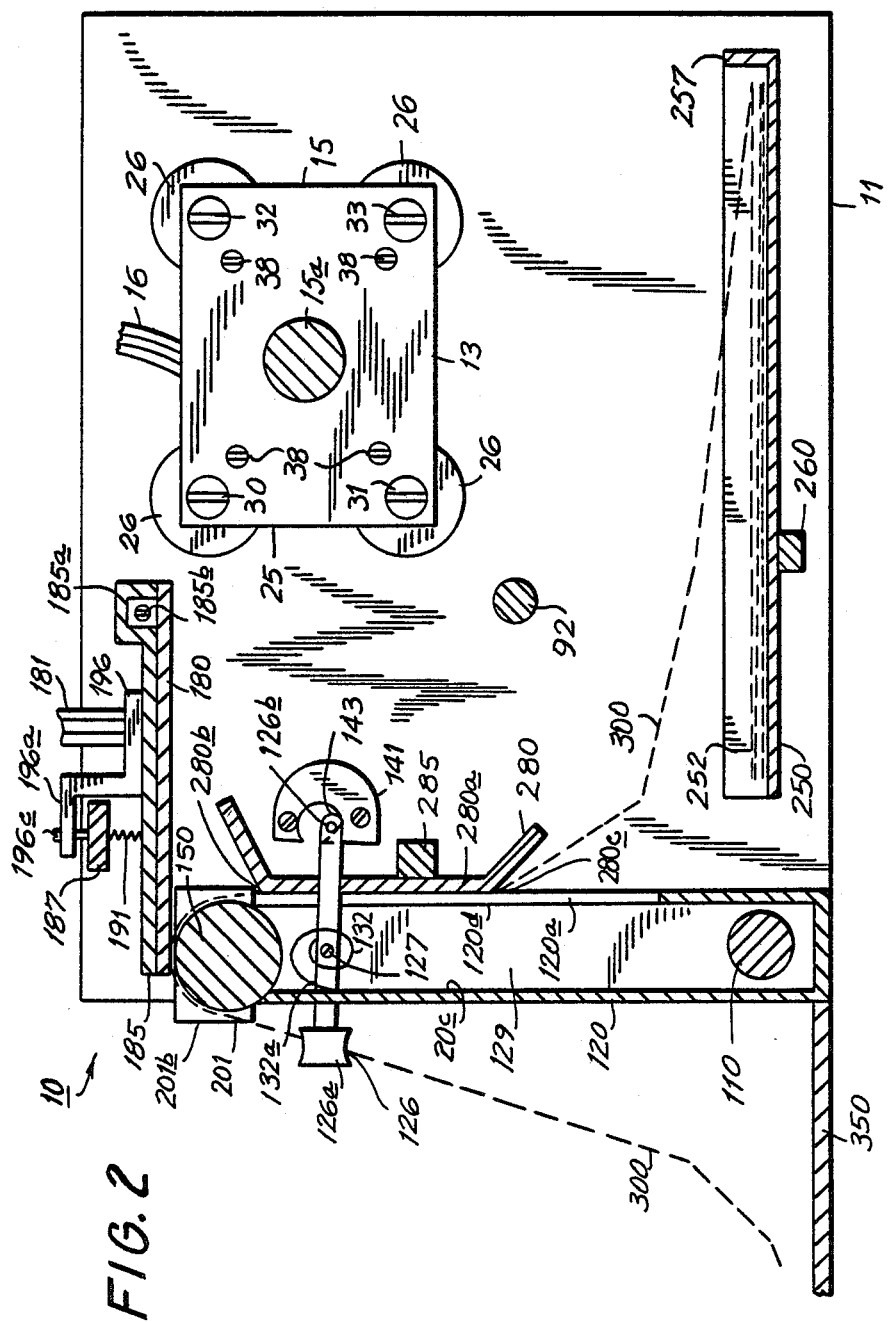
FIG. 2 is a side elevational view of the recording device taken along the lines 2—2 in FIG. 1.
Figure 3:
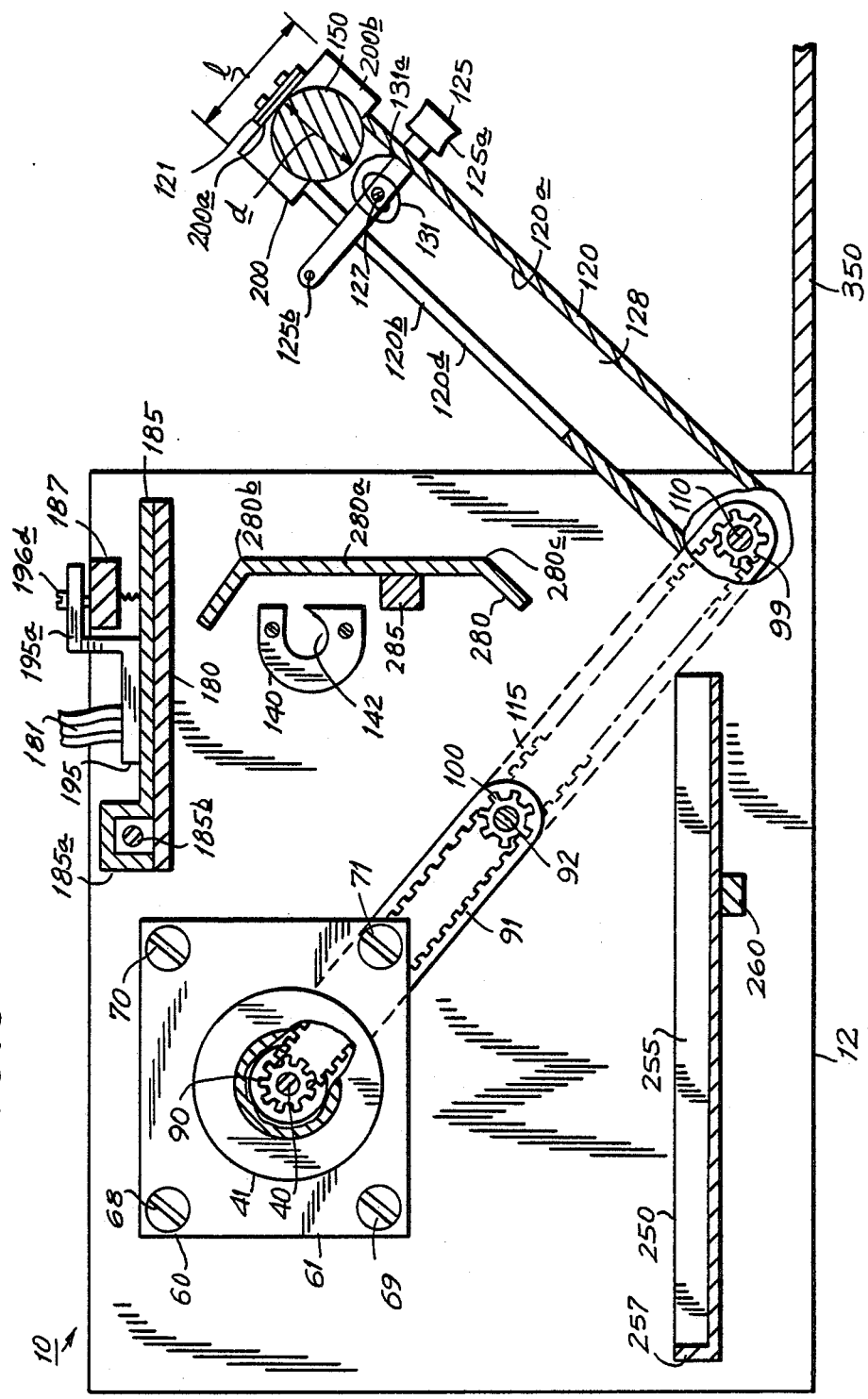
FIG. 3 is a side elevational view of the recording device taken along the lines 3—3 in FIG. 1 with, however, the door of the device partially open.

As shown in FIG. 1, 2 and 3, a recording device 10 having walls 11 and 12 includes a stepping motor 15 manufactured by Howard Industries of Singapore as part no. 1-19-3404 which is energized by a mciroprocessor (not shown) generating appropriate electronic pulses through wires 16. Motor 15 produces a torque as its output shaft 15a moves at two hundred steps per revolution. Surrounding motor 15 is an enclosure 13 for securing motor 15 to wall 11 which comprises four hollow tubes 20, 21, 22 and 23; a motor plate 25; rubber washers 26 and screws 30-38. Tubes 20-23, which are made of aluminum such as type 24 ST available from Mohawk Aluminum Co. of Wallingford, Conn., are each located at a corner of motor 15 so as to form a square thereabout. Plate 25 is also made of type 24 ST aluminum. Tubes 20-23 are each located at a corner of plate 25. Motor 15 is connected to plate 25 through screws 38 which extend through plate 25 and into the casing of motor 15. As shown in the cutaway portion of tube 22, internal threads 35 at either end of tube 22 receive screws 32 and 34. Similarly, tubes 20, 21 and 23 receive screws 30 and 36, 31 and 37, and 33 and 35, respectively. Screws 30-33 extend through holes in plate 25 to connect plate 25 to tubes 20-23, respectively. Rubber washers 36, which are located between wall 11 and tubes 20-23 have apertures (as shown in the cutaway view of one of the washers) through which screws 34-37 extend. Washers 26 serve to absorb the pulse stepping mechanical vibrations created by motor 15 as the latter rotates.

The torque produced by motor 15 is fed by shaft 15a of motor 15 to a coupling 39 which transfers the torque to a shaft 40. Coupling 39 is available from W. Berg Co. of Far Rockaway, N.Y. as part no. CO 14-3. Connected to shaft 40, which is made of type 303 stainless steel and available from Corometrics Medical Systems, Inc. of Wallingford, Conn., is a fly wheel 41 which serves to smooth the somewhat jerky, stop and go torque movement produced by motor 15. Fly wheel 41 is also type 303 stainless steel available from Corometrics Medical Systems, Inc. Shaft 40 is surrounded near its distal end by an enclosure 60. Enclosure 60, which supports shaft 40, comprises plates 61 and 62, tubes 64-67, screws 68-71 and nuts 68a-71a. Screws 68-71 are screwed into corresponding tubes 64-67 so as to hold enclosure 60 together. Additionally, screws 68-71 extend through holes of wall 12 to secure enclosure 60 thereto. Nuts 68a, 69a, 70a and 71a are attached to corresponding screws 68, 69, 70 and 71 to hold the latter to wall 12. Bearings 40a and 40b seated on shaft 40 within holes of plates 61 and 62 through which shaft 40 passes allow shaft 40 to rotate without coming into direct contact with either plate 61 or 62.

Circumferentially connected to shaft 40 is a gear wheel 90 positioned between plates 61 and 62. A second shaft 92, which is rotatable through bearings 92a and 92b secured to walls 11 and 12, has rotatably connected thereto a second gear wheel 100 near wall 12 and is in the same plane as gear wheel 90. Gear wheels 90 and 92 are shown in cutaway views in FIG. 3. A flexible plastic material such as nylon produced by the W. Berg Co., having teeth on its inner surface which meshes with the teeth on gear wheels 90 and 100, serves as a belt 91 connecting the two gear wheels together and thereby transmits the torque of shaft 40 to shaft 92. A third shaft 110, which is parallel to both shafts 92 and 40, is rotatably secured to walls 11 and 12 through bearings 110a and 110b near a bottom corner of walls 11 and 12. Shaft 110 rotatably supports a door 120 which pivots about shaft 110.

Figure 4:
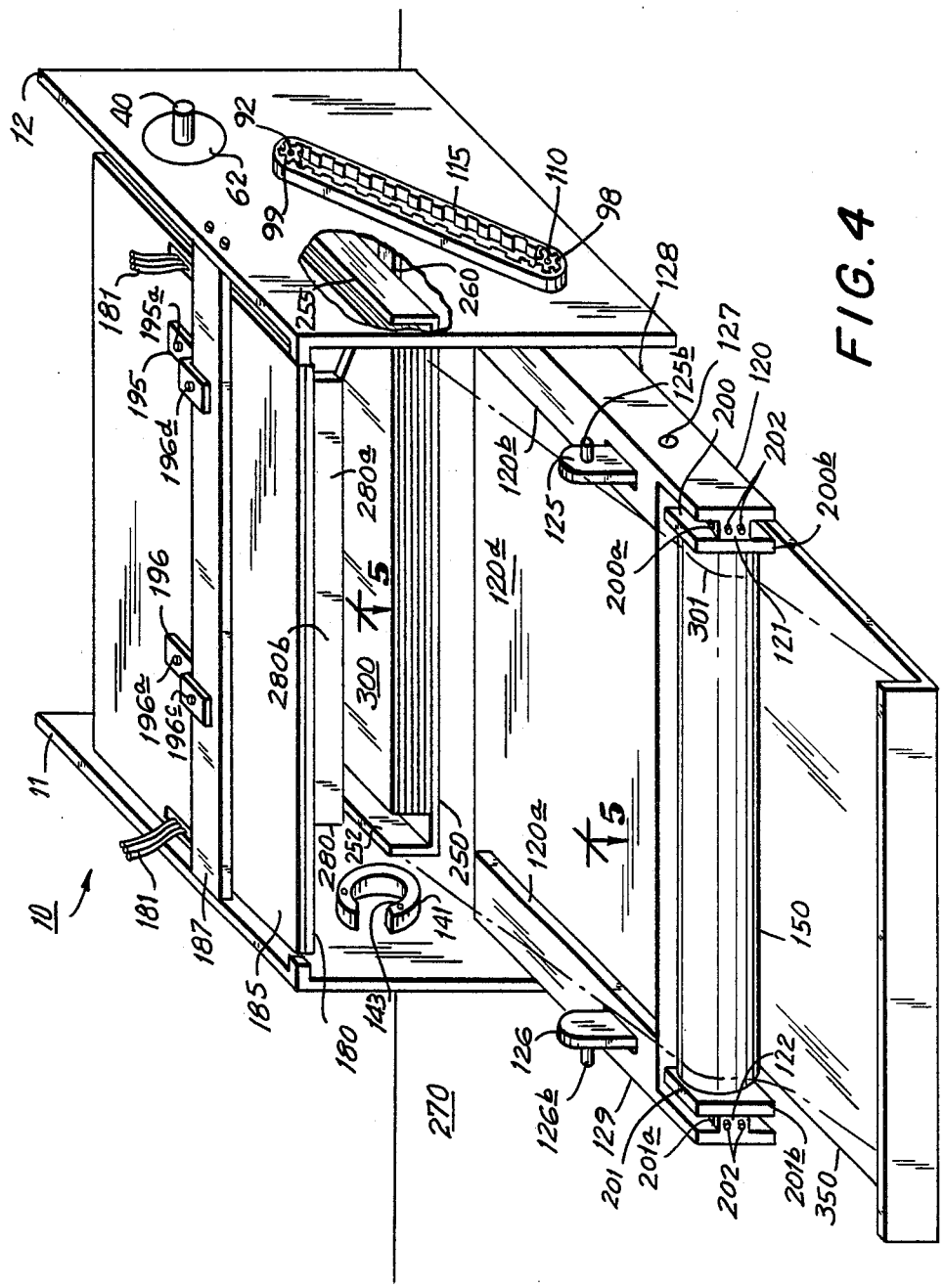
FIG. 4 is a perspective view of the recording device with the door open.

As shown in FIG. 4, gear wheels 98 and 99 are circumferentially connected to shaft 110 and 92, respectively, on the outer surface of wall 12 by a belt 115 made of flexible plastic material such as nylon having teeth which mesh with the teeth of gear wheels 98 and 99 so as to transfer the torque of shaft 92 to shaft 110. Shafts 92 and 110 are both made of stainless steel and available as part no. B 6564AA from Corometrics Medical Systems, Inc.

As shown in FIGS. 2, 3 and 4, door 120, which both pivots about and is supported by shaft 110, spans the length between walls 11 and 12. Bearings 110a and 110b are located on either end of shaft 110 and seated within walls 11 and 12, respectively. Door 120, which is made of 1010 AISI steel, is secured in its upright position by two arms 125 and 126 which pivot about a shaft 127. At the top of door 120 are flat ledges 121 and 122 which both extend inwardly toward each other and perpendicular to door 120. Shaft 127 extends between and is secured within sides 128 and 129 of door 120. Arms 125 and 126 have handles 125a and 126a and protrusions 125b and 126b, respectively. Protrusions 125b and 126b extend outwardly from and in a direction substantially perpendicular to their associated arms. Springs 131 and 132 are wrapped around shaft 127, are connected to arms 125 and 126, respectively, and have their respective distal ends 131a and 132a pressed against an inner surface 120c of door 120. Consequently, springs 131 and 132 bias protrusions 125b and 126b in a downwardly direction, respectively. U-shaped latches 140 and 141, which are secured to walls 12 and 11 by screws or other suitable means include grooves 142 and 143 operable for receiving protrusions 125b and 126b, respectively. Door 120 is therefore held in its upright position by protrusions 125b and 126b being seated within grooves 142 and 143, respectively.

Figure 5:
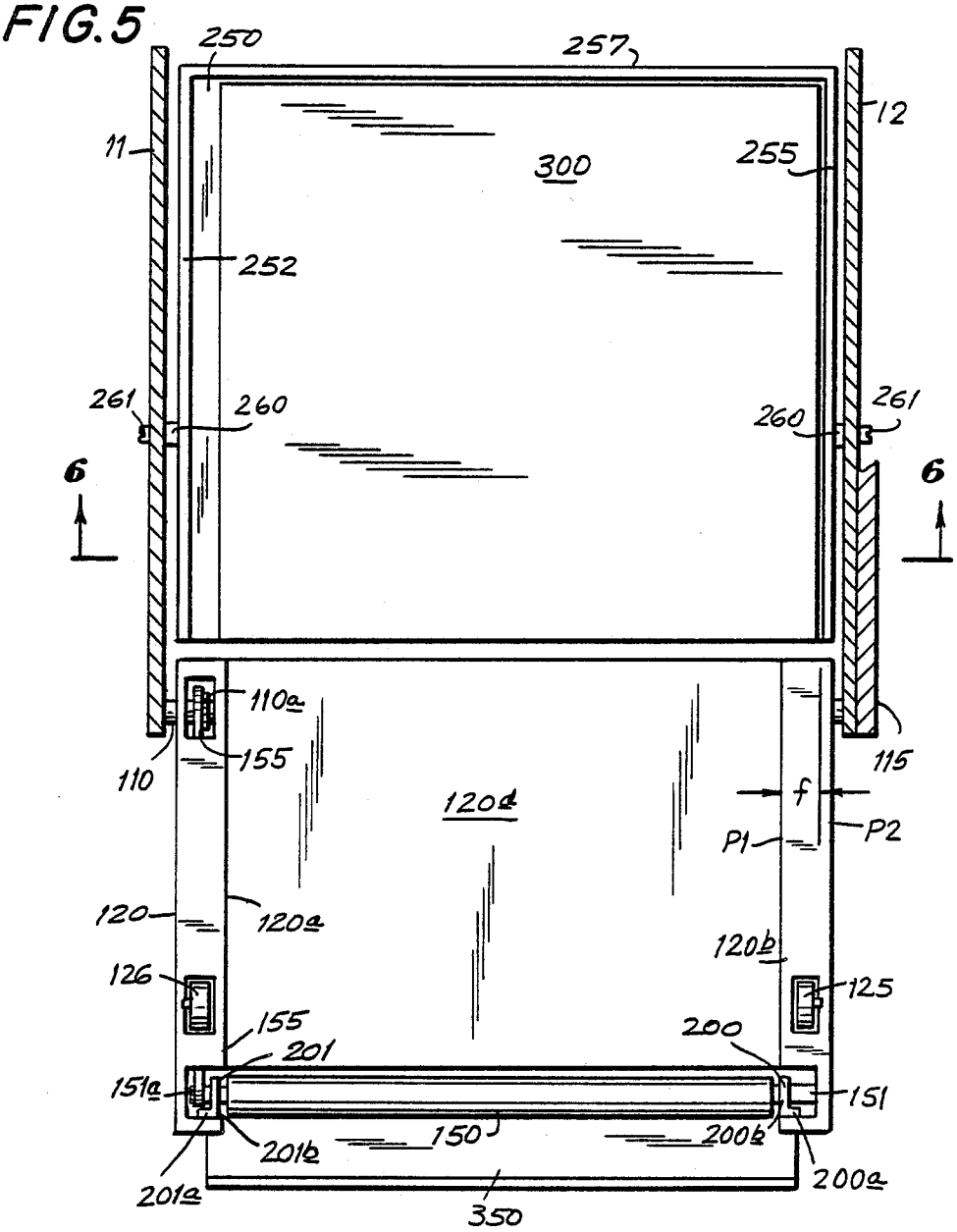
FIG. 5 is a cross sectional view of the recording device taken along the lines 5—5 in FIG. 4.

Referring now to FIG. 5, roller 150 is rotably supported by a shaft 151. Gear wheels 110a and 151a, which are attached to shafts 110 and 151, respectively, lie in the same plane and are connected to a toothed belt 155 to transfer the rotational motion of shaft 110 to roller 150. Accordingly, the torque output of motor 15 is coupled to roller 150 for rotational motion of the latter.

Referring once again to FIG. 2, 3 and 4, thermal printhead 180 is biased (as discussed below) towards roller 150 so as to be in contact with the latter when door 120 is in its closed position, that is, in its upright postion. Thermal printhead 180 is manufactured by Ricoh Co. Ltd. of Tokyo, Japan and is energized by appropriate logic signals, produced by a microprocessor (not shown) through wires 181.

Attached to thermal printhead 180 is a rigid plate 185 made, for example, of extruded aluminum by Himmel Brothers Inc. of Hamden, Conn. which is secured to printhead 180 by screws (not shown) or other conventional well known means. A rigid bar 187 also made of type 24 ST aluminum, is connected between and to walls 11 and 12 by screws (not shown) and is positioned above plate 185. Springs 190 and 191 are positioned between bar 187 and plate 185 and thus bias thermal printhead 180 downwardly. Two arms 195 and 196 having Z cross sectional areas are connected to plate 185 behind bar 187 by screws 195a and 196a. Tops 195a and 196a of arms 195 and 196, respectively, extend in a direction toward and are parallel to and above bar 187. Adjustment screws 196c and 196d extend through tops 196a and 195a, respectively, to limit the downward movement of thermal printhead 180 provided by springs 190 and 191. As mentioned previously, whenever door 120 is in its upright position thermal printhead 180 will be in contact with roller 150 and pressed slightly upwardly.

Additionally, a U-shaped trough 185a is integrally connected to plate 185, located at the rear of the latter, and rests upon the rear portion of printhead 180. A pivot rod 185b extends through trough 185a, is bounded by trough 185a and printhead 180, and is connected to walls 11 and 12 through bearings 186c. Accordingly, upon door 120 being swung to its upright position, printhead 180 pivots about rod 185b.

Referring now to FIGS. 4 and 5, paper guides 200 and 201 are located next to the ends of roller 150 and are made of stainless steel or other suitable material. The paper guides 200 and 201 have upside down L-shaped cross sectional areas comprising bottom legs 200a and 201a and stems 200b and 201b, respectively. The legs 200a and 201a are connected to ledges 121 and 122 of door 120, respectively, by screws 202. Stems 200b and 201b have a U-shaped opening (not shown) dimensioned to permit shaft 151 to extend therethrough. As shown in FIG. 3, the length 1 of stem 200b (and 201b) is approximately 1.375 inches whereas the diameter of roller 150 is approximately 1.0 inch.

Figure 6:
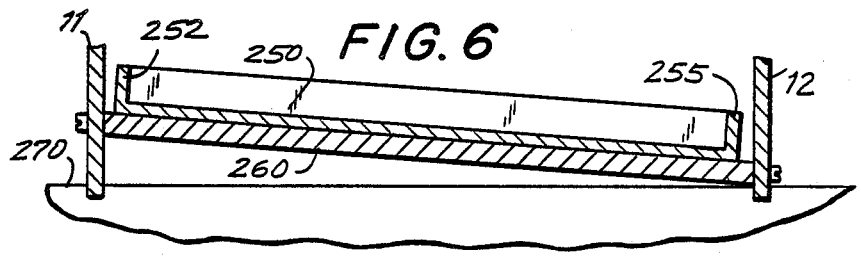
FIG. 6 is a cross sectional view of the recording device taken along the lines 6—6 of FIG. 5.

A paper tray 250 having side walls 252 and 255 and a back wall 257 is disposed between walls 11 and 12 and is connected to a bar 260. Bar 260 is also connected to walls 11 and 12 by screws 261 which extend through walls 11 and 12 and into bar 260. Paper tray 250 is connected to bar 260 also through the use of screws (not shown) or other well known methods of connection. Walls 252, 255 and 257 rise from the bottom of tray 250 in perpendicular directions thereto. Tray 250 and bar 260, as particularly shown in FIG. 6, are at a slight tilt from a horizontal surface 270 upon which the device 10 rests. This tilt, which has been exaggerated for illustrative purposes only, is typically approximately 1 degree from horizontal surface 270. Door 120 has a flat trench area 120d with walls 120a and 120b thereof aligned with arms 126 and 125 and paper guides 201 and 200, respectively, for purposes to he discussed below. Trench 120d is made of type 6061 T6 aluminum.

As shown in FIG. 5, paper guide 200 and particularly stem 200b as well as wall 120b and arm 125 are positioned slightly inwardly from side wall 255. In other words, paper guide 200, wall 120b arm 125 extend in a plane $p_1$ whereas wall 255 extends in a different parallel plane $p_2$ and at a fixed distance (f) from plane $p_1$.

Referring once again to FIGS. 2, 3, 4 and 5, a paper plate 280 is shown and is made from aluminum type 6061 T6. Plate 280 is hard coated with, for example, an anodized coating of aluminum oxide which is available from Corometrics Medical Systems, Inc. Plate 280 has a substantially U-shaped cross section with a relatively flat bottom 280a and is attached by screws (not shown) to a bar 285 which extends between and screws into walls 11 and 12. Plate 280 is centrally located between walls 11 and 12 arid is positioned such that upon door 120 being placed in its upright position, (i) trench walls 120a and 120b are on either side of plate 180, (ii) edge 280b of bottom 280a is adjacent to roller 150 and (iii) edge 20c is approximately 1½" from the nearest corner of wall 255. Furthermore, upon door 120 being closed, an 8/1000" clearance exist between bottom 280a of paper plate 280 and trench area 120d of door 120.

Dimensionally, walls 11 and 12 are approximately 6¾"×5⅝". Door 120 is approximately 6"×5". Paper guides 200 and 201 are each approximately ½"×1" and are separated from each other by a distance of 5.122". Paper tray 250 is approximately 5"×5¼" with walls 252, 255 and 257 each being ¾" in height, approximately 5" in length and 1/16" in thickness. Bottom 280a of plate 280 is 5.072" wide and approximately 1½" in length. Trench 120d is approximately ⅛" in depth, approximately 2½" in length and has a width between 5.122" and 5.125".

As shown in FIGS. 2, 4 and 5, device 10 operates as follows: A paper supply 300 such as Z fold paper manufactured by Graphics Central Inc. of Buffalo, N.Y. as no. 5235AA0 is stored in paper tray 250. This paper has orange grid lines on a white background with a thermal coating to permit black graphics to be printed by printhead 180. The paper has a width which nominally varies between 5.098" to 5.122". Initially, paper 300 is placed within paper tray 250 as shown in FIG. 5. The first page of paper supply 300 is then fed between arms 125 and 126 into trench 120d and then between paper guides 200 and 201 while door 120 is in its open, that is, in a substantially horizontal position (as shown in FIG. 4 by the dashed lines). As shown in FIG. 2, upon door 120 being closed so that paper 300 is pressed against thermal printhead 180 by roller 150, paper 300 will have one of its edges 301 urged against paper guide 200. More particularly, edge 301 will be forced against wall 120b and guide 200 due to edge 301 traveling from a position which is closer to wall 12 (namely, wall 255 of tray 250) to a position further away from wall 12 (namely the junction of wall 200b and roller 150) while the paper supply 300 is dispensed in a direction parallel to the horizontal surface 270. Furthermore, paper 300, which has a thickness of 2/1000", is trapped between paper plate 280 and trench 120d when door 150 is in its upright position and thus ensures that edge 301 of paper 300 will be initially properly positioned for contact against paper guide 200. As roller 150 rotates due to motor 15 being energized, the path that paper 300 travels along will be maintained in a predetermined and desired track due to edge 301 being continually urged against paper guide 200 and wall 120b. Additionally, due to the tilt of paper tray 250, edge 301 is urged against wall 255 which further helps to maintain edge 301 against wall 200b and 120b. Still further and as can now be understood, paper guide 201 and wall 120a primarily serve to initially properly position paper 300 on roller 150 and within trench 120d, respectively.

An additional tray 350 is connected to the bottom of walls 11 and 12 and extends in front of door 120 to catch the paper upon which information from thermal printhead 180 has been recorded.

As can now be readily appreciated, the present invention substantially inhibits the lateral movement of paper supply 300 by urging edge 301 to be pressed against wall 120b and paper guide 200 as paper supply 300 travels past thermal printhead 180. Thus, inaccurately plotted information is substantially reduced. Additionally, by urging the paper supply to travel along a predetermined path, the tendency of the paper to become misaligned when the printer is stopped is substantially reduced. Furthermore, in view of the above, the amount of paper required to be advanced past the printer prior to turning the printer on each time in order to maintain a predetermined path for the paper to follow is substantially reduced.

Having specifically described an illustrative embodiment of the invention with reference to the accompanying drawings, it is to be understood that the invention is not limited to this precise embodiment and that various changes and modifications may be effected therein by one skilled in the art without departing from the scope and spirit of the invention as defined in the appended claims.

I claim:

1. A recording device for recording information on a major surface of a paper medium comprising:

storage means for holding and dispensing the paper medium in a particular dispensing direction, said storage means having a generally horizontal storage surface with a side edge, the paper medium resting on said storage surface with its major surface parallel to the storage surface, said storage surface being at an acute angle with respect to the horizontal plane, said acute angle being in a plane generally orthogonal to said particular dispensing direction such that the paper is urged toward the side edge of said storage surface;

storage guide means located towards the side edge of said storage surface and intercepting the paper medium which is urged toward the side edge so as to align the paper medium, said storage guide means extending in a first plane which is generally parallel to the paper dispensing direction and generally orthogonal to the said storage surface; and paper guide means for guiding one edge of the paper during its movement in a certain direction from said storage means to a location where said information is recorded thereon, said paper guide means extending in a second plane which is generally parallel to the paper movement direction and generally orthogonal to the paper surface, said second plane being at a fixed lateral distance from said first plane in a direction toward the center of the paper medium major surface such that said paper medium is urged against said paper guide means by stress created in the paper medium due to the lateral displacement of said second plane with respect to said first plane.

2. A recording device as in claim 1 wherein said device further comprises a roller upon which said paper rests as the information is recorded thereon and wherein said paper guide means is disposed adjacent to said roller.

3. A recording device as in claim 1 wherein said storage means comprises a tray which includes said storage surface and at least one shoulder, which shoulder serves as said storage guide means.

4. A recording device as in claim 1 wherein said paper is Z fold paper.

5. A recording device as in claim 1:
wherein said paper guide means includes an arm and a door means for providing access to said storage means, said door means including a trench having first and second walls, said first wall and said arm extending in said second plane; and
further including plate means operable for trapping said paper medium between said walls of said trench.

6. A recording device for recording information on a major surface of a paper medium comprising:
storage means for holding and dispensing the paper medium in a particular dispensing direction, said storage means having a generally horizontal storage surface with a side edge, the paper medium resting on said storage surface with its major surface parallel to the storage surface, said storage surface being at an acute angle with respect to the horizontal plane, said acute angle being in a plane generally orthogonal to said particular dispensing direction such that the paper is urged toward the side edge of said storage surface;
storage guide means located towards the side edge of said storage surface and intercepting the paper medium which is urged toward the side edge so as to align the paper medium, said storage guide means extending in a first plane which is generally parallel to the paper dispensing direction and generally orthogonal to the said storage surface; and
paper guide means for guiding one edge of the paper during its movement in a certain direction from said storage means to a location where said information is recorded thereon, said paper guide means extending in a second plane which is generally parallel to the paper movement direction and generally orthogonal to the paper surface.

7. A recording device as in claim 6 wherein said device further comprises a roller upon which said paper rests as the information is recorded thereon and wherein said paper guide means is disposed adjacent to said roller.

8. A recording device as in claim 6 wherein said paper is Z fold paper.

9. A recording device as in claim 6:
wherein said paper guide means includes an arm and a door means for providing access to said storage means, said door means including a trench having first and second walls, said first wall and said arm extending in said second plane; and
further including plate means operable for trapping said paper medium between said walls of said trench.

10. A recording device as in claim 6 wherein said storage means comprises a tray which includes said storage surface and at least one shoulder, which shoulder serves as said storage guide means.

11. A recording device for recording information on a major surface of a paper medium comprising:
storage means for holding and dispensing the paper medium in a particular dispensing direction, said storage means having a generally horizontal storage surface with a side edge, the paper medium resting on said storage surface with its major surface parallel to the storage surface;
storage guide means located towards the side edge of said storage surface and aligning the paper medium, said storage guide means extending in a first plane which is generally parallel to the paper dispensing direction and generally orthogonal to the said storage surface; and
paper guide means for guiding one edge of the paper during its movement in a certain direction from said storage means to a location where said information is recorded thereon, said paper guide means extending in a second plane which is generally parallel to the paper movement direction and generally orthogonal to the paper surface, said second plane being at a fixed lateral distance from said first plane in a direction toward the center of the paper medium major surface such that said paper medium is urged against said paper guide means by stress created in the paper medium due to the lateral displacement of said second plane with respect to said first plane.

12. A recording device as in claim 11:
wherein said paper guide means includes an arm and a door means for providing access to said storage means, said door means including a trench having first and second walls, said first wall and said arm extending in said second plane; and
further including plate means operable for trapping said paper medium between said walls of said trench.

13. A recording device as in claim 11 wherein said storage means comprises a tray which includes said storage surface and at least one shoulder, which shoulder serves as said storage guide means.

14. A recording device as in claim 11 wherein said device further comprises a roller upon which said paper rests as the information is recorded thereon and wherein said paper guide means is disposed adjacent to said roller.

15. A recording device as in claim 11 wherein said paper is Z fold paper.

* * * * *